United States Patent
Shibata et al.

(10) Patent No.: US 8,495,861 B2
(45) Date of Patent: Jul. 30, 2013

(54) FAULT DETECTION SYSTEM FOR PM TRAPPER

(75) Inventors: Daisuke Shibata, Numazu (JP); Hiroshi Sawada, Gotenba (JP); Keisuke Fukuoka, Shizuoka (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 584 days.

(21) Appl. No.: 12/303,500

(22) PCT Filed: Jun. 7, 2007

(86) PCT No.: PCT/JP2007/061951
§ 371 (c)(1),
(2), (4) Date: May 11, 2009

(87) PCT Pub. No.: WO2007/142359
PCT Pub. Date: Dec. 13, 2007

(65) Prior Publication Data
US 2010/0018186 A1    Jan. 28, 2010

(30) Foreign Application Priority Data
Jun. 7, 2006 (JP) .................................. 2006-158465

(51) Int. Cl.
*F01N 3/021* (2006.01)
(52) U.S. Cl.
USPC .............................................. 60/277; 60/297
(58) Field of Classification Search
USPC .......................................... 60/277, 297, 311
See application file for complete search history.

(56) References Cited

U.S. PATENT DOCUMENTS

| 2002/0196153 | A1 | 12/2002 | Kinugawa et al. |
| 2004/0159099 | A1 | 8/2004 | Kuboshima et al. |
| 2005/0016137 | A1 | 1/2005 | Hamahata et al. |
| 2005/0268597 | A1 | 12/2005 | Kosaka |
| 2006/0026950 | A1* | 2/2006 | Kondou et al. ................. 60/297 |
| 2007/0056271 | A1* | 3/2007 | Berryhill et al. ................. 60/297 |
| 2007/0180818 | A1* | 8/2007 | Matsuoka et al. .............. 60/286 |

FOREIGN PATENT DOCUMENTS

| EP | 1 316 693 A1 | 6/2003 |
| EP | 1 555 401 A1 | 7/2005 |
| EP | 1 602 806 A1 | 12/2005 |

(Continued)

OTHER PUBLICATIONS

European search Report dated Jan. 12, 2011 issued in the corresponding European application No. 07767116.2.

*Primary Examiner* — Thomas Denion
*Assistant Examiner* — Jonathan Matthias
(74) *Attorney, Agent, or Firm* — Sughrue Mion, PLLC

(57) ABSTRACT

An object of the present invention is to provide a technology that enables detection of a fault of a PM trapper with improved accuracy. In the present invention, a pressure sensor 20 that measures a differential pressure across a PM trapper 11 is provided, and a fault of a PM trapper is determined based on an amount of change in the differential pressure across the PM trapper 11 between two different operation states of an internal combustion engine 1 in which the ambient temperature around the pressure sensor 20 falls within a specific temperature range. Since variations in the offset error of the differential pressure sensor 20 caused by changes in the ambient temperature around the differential pressure sensor 20 is made small, the amount of change in the differential pressure across the PM trapper 11 can be measured more accurately, and a fault of the PM trapper 11 can be detected with improved accuracy.

3 Claims, 4 Drawing Sheets

FOREIGN PATENT DOCUMENTS

| | | |
|---|---|---|
| JP | 06-323127 A | 11/1994 |
| JP | 2002-371827 A | 12/2002 |
| JP | 2003-155920 A | 5/2003 |
| JP | 2004-044443 A | 2/2004 |
| JP | 2004-132358 A | 4/2004 |
| JP | 2004-245123 A | 9/2004 |
| JP | 2004-308454 A | 11/2004 |
| JP | 2004-353606 A | 12/2004 |
| JP | 2005-194974 A | 7/2005 |
| JP | 2005-201119 A | 7/2005 |
| JP | 2005256718 A * | 9/2005 |
| JP | 2005-299460 A | 10/2005 |

* cited by examiner

US 8,495,861 B2

FAULT DETECTION SYSTEM FOR PM TRAPPER

CROSS REFERENCE TO RELATED APPLICATIONS

This application is the national phase application under 35 U.S.C. §371 of PCT international application No. PCT/JP2007/061951 filed on 7 Jun. 2007, which claims priority to Japanese patent application No. 2006-158465 filed on 7 Jun. 2006, the contents of which are incorporated herein by reference.

TECHNICAL FIELD

The present invention relates to a fault detection system for a PM trapper.

BACKGROUND ART

In exhaust gas purification systems equipped with a PM trapper that traps particulate matter (which will be hereinafter abbreviated as "PM") in the exhaust gas from an internal combustion engine, regeneration process for removing the trapped or collected PM from the PM trapper by oxidizing it is performed at a time when a certain amount of PM has been collected on the PM trapper.

If the regeneration process is performed for a PM trapper that is in an "over-collection" state for some reason, oxidation reaction of a large amount of PM may occur drastically, and a fault such as melting of the PM trapper may be caused by the reaction heat generated therein in some cases.

Heretofore, technologies intended for early detection of such a fault have been proposed. For example, Japanese Patent Application Laid-Open No. 6-323127 discloses a technology of detecting a fault in a PM trapper based on a comparison of a differential pressure across the PM trapper just after execution of regeneration process and the minimum value of the differential pressure across the PM trapper at the time when it was brand-new.

Furthermore, Japanese Patent Application Laid-Open No. 2004-308454 discloses a technology intended to detect a fault in a PM trapper accurately at an early time after the occurrence of the fault by measuring the pressure of the exhaust gas downstream of the PM trapper, calculating the amplitude of pulsation of the pressure, and making a determination that a fault is present when the amplitude of pulsation exceeds a specific value.

Still further, Japanese Patent Application Laid-Open No. 2003-155920 discloses an abnormality detection apparatus for PM trapper that is provided with a differential pressure sensor that detects a differential pressure across a PM trapper and a determination device that makes a determination that the PM trapper is clogged when an abnormal increase in the back pressure is detected based on the differential pressure actually measured by the differential pressure sensor and makes a determination that the PM trapper is damaged by melting when an abnormal decrease in the back pressure is detected, wherein the determination device is configured to subtract, upon making a determination, a value corresponding to an increase in the backpressure caused by ash that has deposited over time from the actually measured differential pressure to enable reliable determination of occurrence of clogging and melting damage in the PM trapper.

Japanese Patent Application Laid-Open No. 2004-353606 discloses a technology concerning an internal combustion engine having a first stage catalyst provided in an exhaust passage and having an oxidizing ability, a PM trapper provided downstream of the first stage catalyst and reducing agent supply means for supplying reducing agent from upstream of the first stage catalyst, in which the reducing agent is supplied by the reducing agent supply means to remove PM trapped by the PM trapper thereby regenerating the PM trapper, wherein a first exhaust temperature sensor that senses the temperature of the exhaust gas downstream of the first stage catalyst and upstream of the PM trapper and a second exhaust gas temperature sensor that senses the temperature of the exhaust gas downstream of the PM trapper are provided, and the larger the difference between the exhaust gas temperature sensed by the first exhaust gas temperature sensor and the exhaust gas temperature detected by the second exhaust gas temperature sensor after a lapse of specified time since the start of removal of PM by the reducing agent supply means is, the higher the degree of deterioration of the first stage catalyst is assessed to be.

Furthermore, Japanese Patent Application Laid-Open No. 2005-201119 discloses a technology for diagnosing clogging of an NOx catalyst, in which there are provided an NOx catalyst disposed in an exhaust passage, a DPNR catalyst disposed downstream of the NOx catalyst, a first temperature sensor that senses the temperature of the exhaust gas that has just passed through the NOx catalyst and a second temperature sensor that senses the temperature of the exhaust gas that has just passed through the DPNR catalyst, and clogging of the NOx catalyst is diagnosed based on the difference between the exhaust gas temperature sensed by the first temperature sensor and the exhaust gas temperature sensed by the second temperature sensor.

Japanese Patent Application Laid-Open No. 2004-132358 discloses a technology concerning a control apparatus that estimates the amount of PM deposited in a PM trapper and performs a regeneration process for the PM trapper based on the estimation result, in which there are provided operation state detection means for detecting the operation state of an internal combustion engine, first estimation means for estimating the amount of PM deposited in the PM trapper based on a differential exhaust gas pressure across the PM trapper, second estimation means for estimating the amount of PM deposited in the PM trapper based on the operation state of the internal combustion engine and difference calculation means for calculating the difference between an estimated value of the deposited PM amount obtained by the first estimation means and an estimated value of the deposited PM amount obtained by the second estimation means. An estimated value obtained by either the first estimation means or the second estimation means is selected in response to the difference calculation means and the operation state detection means, and timing of performing regeneration process for the PM trapper is determined according to the selected estimated value so as to perform the regeneration process for the PM trapper at appropriate timing.

DISCLOSURE OF THE INVENTION

Although the differential pressure across a PM trapper is measured typically using a differential pressure sensor, the measurement value of the differential pressure sensor contains an offset error. The offset error refers to a systematic error that occurs regularly as a constant offset of the measurement value of the differential pressure sensor from the input value of the differential pressure sensor under the same condition. The presence of offset errors may prevent conventional methods of determining a fault based on the absolute value of a measurement value of the differential pressure sensor from making an accurate fault determination in some cases, if the extent of a fault of the PM trapper 11 is small.

Therefore, in order to achieve accurate fault determination, it is necessary to eliminate the offset error from the measurement value of the differential pressure sensor. However, since the offset error occurs in different ways among individual differential pressure sensors, it has been difficult to eliminate offset errors from measurement values of pressure sensors by a systematic method that can be applied to all the differential pressure sensors.

The present invention has been made in view of this problem and has as an object to provide a technology that makes it possible to detect a fault of a PM trapper with improved accuracy.

To achieve the above described object, a fault detection system for a PM trapper according to the present invention is characterized by comprising a PM trapper that traps particulate matter in exhaust gas of an internal combustion engine, a differential pressure sensor that measures a differential pressure across said PM trapper, and a fault detection unit for detecting a fault of said PM trapper based on an amount of change in the differential pressure across said PM trapper associated with a change in an operation state of said internal combustion engine.

By this configuration, the fault detection unit measures the differential pressure across the PM trapper in different operation states of the internal combustion engine by the differential pressure sensor and determines a fault of the PM trapper based on the difference between the measured values. For example, an amount of change in the differential pressure across a normal PM trapper in the above described different operation states of the internal combustion engine is obtained in advance by, for example, experiments, and a fault of the PM trapper is determined by comparing the aforementioned difference between the measured values with this amount, which serves as a reference value.

In this way, by obtaining the difference between the measurement values of the differential pressure sensor in different operation states, the offset error contained in the absolute values of the measurement values of the differential pressure sensor can be cancelled. Therefore, it is possible to detect a fault of the PM trapper with improved accuracy.

By the way, the offset error of the differential pressure sensor may change depending on the ambient temperature (e.g. temperature of the exhaust gas) around the differential pressure sensor in some cases. In other word, even if the differential pressure sensor is the same, the offset error may change with a change, if any, in the ambient temperature around the differential pressure sensor in some cases.

In such cases, when the relative value between measurement values of the differential pressure sensor in different operation states is calculated as described above, the values of the offset errors contained in the measurement values of the differential pressure sensor in the respective operation states may differ from each other if the ambient temperatures around the differential pressure sensor in the respective operation states differ significantly from each other. Thus, there is a possibility that the offset errors cannot be cancelled satisfactorily.

In view of this, in the present invention, a fault of said PM trapper may be detected based on an amount of change in the differential pressure across said PM trapper associated with such a change in the operation state of said internal combustion engine in which an amount of change in the ambient temperature around said differential pressure sensor is not larger than a predetermined amount. The predetermined amount is determined in advance by, for example, experiments as an amount of change in the ambient temperature that hardly causes a change in the offset error of the differential pressure sensor. For example, if the difference between the measurement values of the differential pressure sensor in different operation states within a certain short time period is obtained, the change in the ambient temperature around the differential pressure sensor will be small.

Thus, the offset errors contained in the measurement values of the differential pressure sensor in the respective operation states are substantially equal to each other, and therefore the offset errors can be cancelled with improved reliability by obtaining a relative value of the measurement values of the differential pressure sensor in the respective operation states. As a result, a fault of the PM trapper can be determined with improved accuracy.

In the present invention, a fault of the PM trapper may be detected based on the ratio (which will be hereinafter referred to as the "differential pressure change ratio") of the amount of change in the differential pressure across the PM trapper and the amount of change in the intake air quantity associated with a change in the operation state of said internal combustion engine.

There is a positive correlation between the differential pressure across a PM trapper and the intake air quantity. When a PM trapper is faulty, the PM trapper is in a holed state, and therefore the differential pressure across the PM trapper tends not to increase even when the intake air quantity increases. In other words, when the PM trapper is faulty, the correlation coefficient in the above-mentioned positive correlation tends to be smaller as compared to that in the case in which the PM trapper is normal. Therefore, the differential pressure change ratio in the case in which the PM trapper is faulty also tends to be smaller as compared to that in the case in which the PM trapper is normal.

Therefore, a fault of the PM trapper can be determined by obtaining a differential pressure change ratio in the case in which the PM trapper is normal in advance by, for example, experiments and using this as a reference value in comparison with a differential pressure change ratio that is calculated based a relative value of the measurement values of the differential pressure sensor in respective different operation states.

In this case also, since the amount of change in the differential pressure across the PM trapper is obtained based on a relative value of the measurement values of the differential pressure sensor, the offset errors of the differential pressure sensor are cancelled, and fault determination for the PM trapper can be performed with improved reliability.

THE BEST MODE FOR CARRYING OUT THE INVENTION

In the following, the best mode for carrying out the present invention will be described in detail by way of example with reference to the drawings. The dimensions, materials, shapes and relative positions etc. of the components of the embodiment described here are not intended to limit the technical scope of the invention only to them unless specifically described in particular.

Embodiment 1

Figure 1:
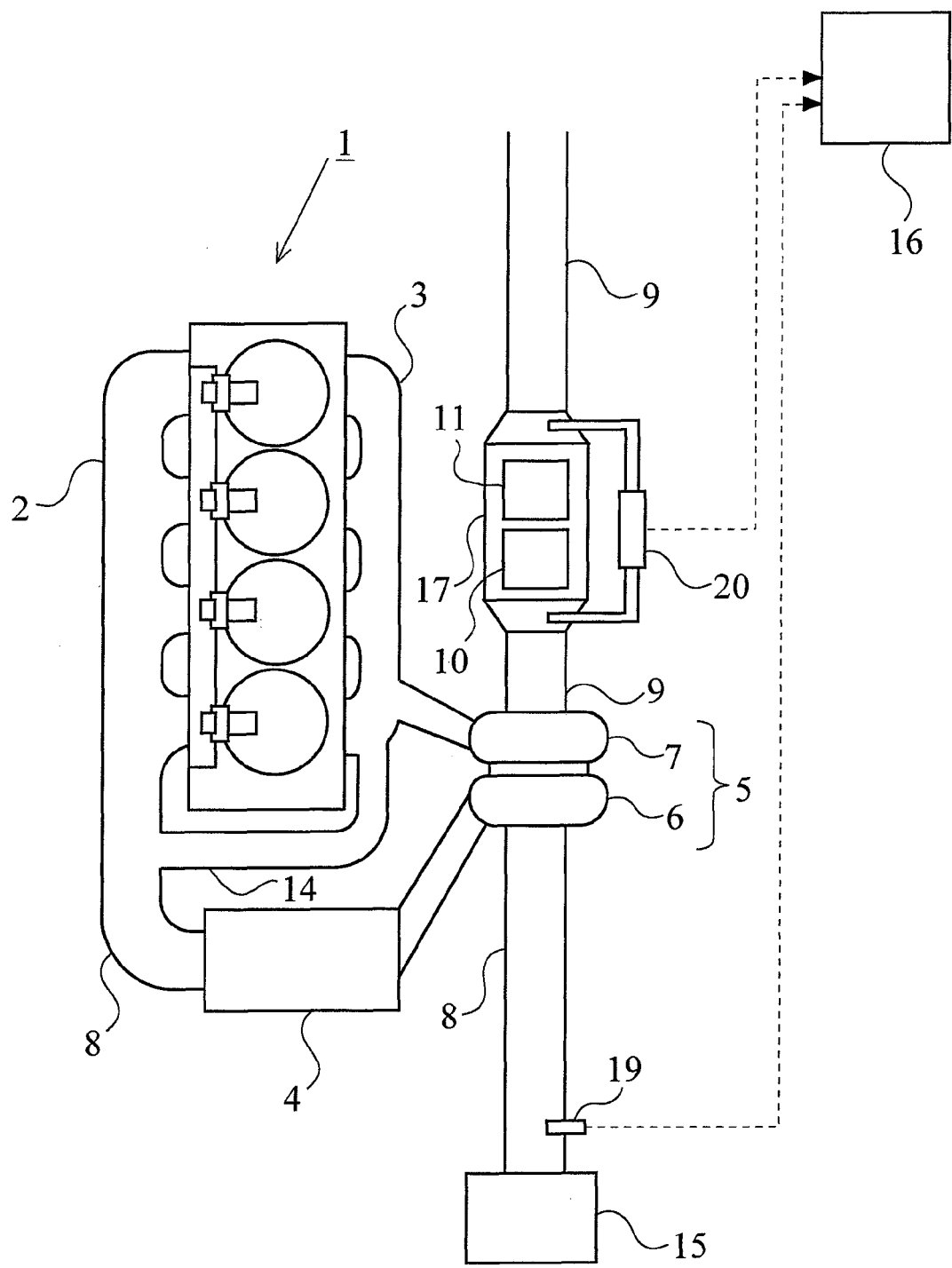
FIG. 1 is a diagram showing the general configuration of the air-intake system and exhaust system of an internal combustion engine in an embodiment of the present invention.

FIG. 1 is a diagram showing the general configuration of the air-intake system and exhaust system of an internal combustion engine to which the fault detection system for a PM trapper according to the present invention is applied.

The internal combustion engine 1 shown in FIG. 1 is a diesel engine having four cylinders.

To the internal combustion engine 1 is connected an intake manifold 2, and each branch pipe of the intake manifold 2 is in communication with the combustion chamber of each cylinder via an intake port. To the intake manifold 2 is connected an intake passage 8. An intercooler 4 that cools the gas flowing in the intake passage 8 is provided at a point in the intake passage 8. A compressor housing 6 of a turbocharger 5 that operates using the energy of the exhaust gas as the drive source is provided upstream of the intercooler 4. An air cleaner 15 is provided upstream of the compressor housing 6.

To the internal combustion engine 1 is connected an exhaust manifold 3, and each branch pipe of the exhaust manifold 3 is in communication with the combustion chamber of each cylinder via an exhaust port. To the exhaust manifold 3 is connected a turbine housing 7 of the turbocharger 5. To the turbine housing 7 is connected an exhaust passage 9. The exhaust passage 9 is provided with an exhaust gas purification apparatus 17. The exhaust passage 9 is open to the atmosphere in the downstream of the exhaust gas purification apparatus 17. The exhaust gas purification apparatus 17 is composed of a PM trapper 11 that traps PM contained in the exhaust gas and an oxidation catalyst 10 disposed upstream of the PM trapper.

The exhaust manifold 3 and the intake manifold 2 are in communication through an EGR passage 14. A part of the exhaust gas recirculates to the combustion chambers of the internal combustion engine 1 through the EGR passage 14. This causes the combustion temperature in the combustion chambers to fall to thereby reduce the amount of nitrogen oxides generated in the combustion process.

In the intake passage 8 downstream of the air cleaner 15 is provided an air flow meter 19 that measures the amount of intake air flowing in the intake passage 8. In the exhaust passage 9 is provided a differential pressure sensor 20 that measures the difference in the exhaust gas pressure between the upstream and the downstream of the exhaust gas purification apparatus 17. The air flow meter 19 and the differential pressure sensor 20 are connected to an ECU 16 that will be described later via electric wiring, and values measured by the air flow meter 19 and the differential pressure sensor 20 are input to the ECU 16.

To the internal combustion engine 1 is annexed an ECU 16 or an electronic control computer that controls the internal combustion engine 1. The ECU 16 is equipped with a ROM, RAM, CPU, input port and output port etc., which are not shown in the drawings, and performs known control such as fuel injection control and fault determination for the PM trapper etc. in response to operation states of the internal combustion engine 1 and driver's requests.

At a time when a predetermined amount of PM has been trapped or collected in the PM trapper 11, a regeneration process for the PM trapper 11 is performed. Here, the predetermined amount is an amount determined based on the upper limit value of PM deposition amounts that can not affect the engine output power of the internal combustion engine 1, which amount is determined in advance by experiments. In the regeneration process, specifically, sub injection is performed in the internal combustion engine 1 separately from main injection for generating torque. This causes a rise in the temperature of the exhaust gas, and the temperature of the PM trapper 11 is increased by the high temperature exhaust gas, which promotes oxidation reaction of the PM deposited on the PM trapper 11. In addition, fuel may be added as a reducing agent into the exhaust gas flowing upstream of the exhaust gas purification apparatus 17. In this case, the fuel added into the exhaust gas reacts in oxidation in the oxidation catalyst 10, and the reaction heat generated therein causes the temperature of the PM trapper 11 to rise, whereby the oxidation reaction of the PM deposited on the PM trapper 11 is promoted.

In connection with this, if the regeneration process is performed at a time when the PM trapper 11 is in an "overcollection" state, the oxidation reaction of PM may progress rapidly to generate a very large amount of reaction heat, and a fault such as melting of the PM trapper 11 etc. may occur in some cases. In such cases, since the PM trapper is brought into a holed state and its ability of PM trapping is deteriorated, it is necessary to detect the fault of the PM trapper 11 as early as possible.

When a fault such as melting damage occurs in the PM trapper 11, the pressure loss in the PM trapper 11 becomes smaller as compared to that at the time when the PM trapper 11 is normal, and therefore the differential pressure across the PM trapper 11 becomes smaller. By making use of this tendency, a fault of the PM trapper 11 can be detected based on the differential pressure across the PM trapper 11.

Figure 2:
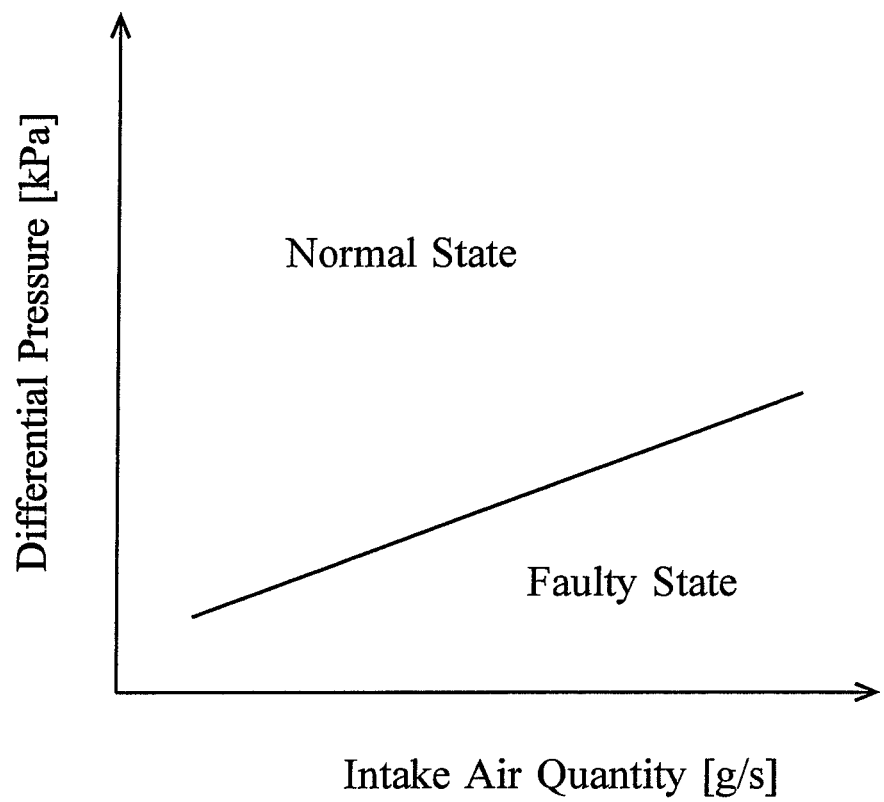
FIG. 2 is a graph showing the lower limit value of differential pressures across a PM trapper at which it may be determined that the PM trapper in the embodiment of the present invention is normal vs. the intake air quantity.

FIG. 2 is a graph showing the lower limit value of differential pressures across the normal PM trapper 11 vs. the intake air quantity. The horizontal axis in FIG. 2 represents the intake air quantity, and the vertical axis represents the differential pressure across the PM trapper 11. Determination of fault of the PM trapper 11 is performed based on a measurement value of the differential pressure sensor 20 using this lower limit value as a reference value. Specifically, if the measurement value of the differential pressure sensor 20 is equal to or larger than the reference value, it is determined that the PM trapper is normal, and if the measurement value of the differential pressure sensor 20 is smaller than the reference value, it is determined that the PM trapper is faulty.

By the way, the measurement value of the differential pressure sensor 20 contains an offset error. The offset error refers to a systematic error that occurs regularly as a constant offset of the measurement value of the differential pressure sensor 20 from the input value of the differential pressure sensor 20 under the same condition. The presence of offset errors may prevent conventional methods of determining a fault based on a comparison of the absolute value of a measurement value of the differential pressure sensor 20 and the reference value from making an accurate fault determination in some cases, if the extent of a fault of the PM trapper 11 is small.

In view of this, in this embodiment, determination of a fault of the PM trapper 11 is made based on the ratio (which will be hereinafter referred to as the "differential pressure change ratio") of the amount of change in the differential pressure across the PM trapper 11 to the amount of change in the intake air quantity between two different operation states that satisfy a specific condition. The two operation states that satisfy a specific condition are such operation states that the amount of change in the intake air quantity between the two operation states is not smaller than a predetermined amount and the time interval between the two operation states is not longer than a predetermined time.

Here, the predetermined amount is an amount of change in the intake air quantity that is determined in advance in such a way that there is a significant difference in the amount of change in the differential pressure across the PM trapper 11 between cases in which the PM trapper 11 is normal and cases in which the PM trapper 11 is faulty. The predetermined amount is set, for example, to a value not smaller than 20 g/s. The predetermined time is a time period during which the ambient temperature around the differential pressure sensor 20 changes little. The predetermined time is determined in advance.

In other words, the two different operation states that satisfy the predetermined condition in this embodiment are operation states between which the intake air quantity changes greatly in a short time. Operation states that satisfy the above condition tend to be realized during acceleration or deceleration.

In the fault determination method for the PM trapper according to the present embodiment, the amount of change in the differential pressure across the PM trapper 11 is obtained based on the difference between the measurement values of the differential pressure sensor 20 in two respective different operation states. Since the two operation states are selected in such a way that the ambient temperatures around the differential pressure sensor 20 in the two operation states are substantially equal to each other, offset errors of the differential pressure sensor 20 in the two respective operation states are substantially equal to each other. Therefore, by obtaining a relative value of the measurement values of the differential pressure sensor 20 in the two respective operation states, the offset errors contained in the respective measurement values are cancelled. Thus, the differential pressure change ratio can be determined with improved accuracy, and a fault of the PM trapper 11 can de determined with improved accuracy.

In addition, since the amount of change in the intake air quantity between the two operation states is large, even when the extent of fault of the PM trapper 11 is small, the difference of the differential pressure change ratio from that in a normal PM trapper 11 in comparison tends to be distinct, and a fault of the PM trapper 11 can de detected with improved reliability.

Figure 3:
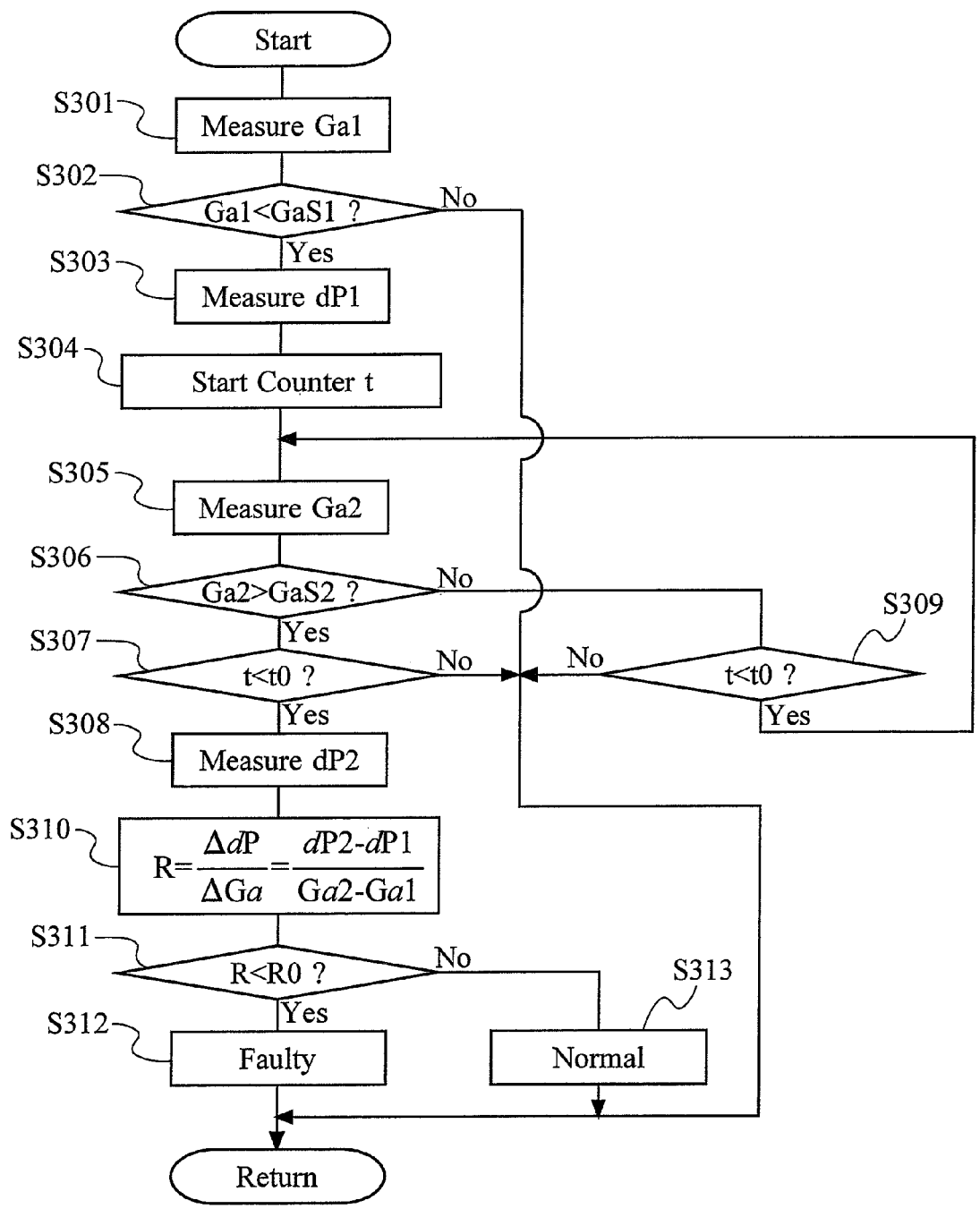
FIG. 3 is a flow chart of a routine of determining a fault of the PM trapper in the embodiment of the present invention.

In the following, fault determination for the PM trapper 11 executed by the ECU 16 will be described with reference to the flow chart in FIG. 3. The flow chart in FIG. 3 is a flow chart illustrating a routine for executing fault determination for the PM trapper 11. This routine is executed by the ECU 16 repeatedly at specific time intervals (e.g. every 16 ms).

First in step S301, the ECU 16 obtains an intake air quantity Ga1 under low load from a measurement value of the air flow meter 19.

Next in step S302, a determination is made as to whether or not the intake air quantity Ga1 measured in the above step S301 is smaller than a first reference air quantity GaS1. If the determination in step S302 is affirmative (Ga1<GaS1), the ECU 16 proceeds to step S303. On the other hand, if the determination in step S302 is negative (Ga1≧GaS1), the ECU 16 once terminates the execution of this routine. The first reference air quantity GaS1 has been determined in advance.

In step S303, the ECU 16 obtains a differential pressure dP1 across the PM trapper 11 under low load from a measurement value of the differential pressure sensor 20.

Next in step S304, the ECU 16 resets a timer counter t to 0 and starts counting of the timer counter t. The timer counter represents the time elapsed after measurement of the differential pressure dP1 across the PM trapper 11 in the above step S303.

Next in step S305, the ECU 16 obtains an intake air quantity Ga2 under high load from a measurement value of the air flow meter 19.

Next in step S306, a determination is made as to whether or not the intake air quantity Ga2 detected in the above step S305 is larger than a second reference air quantity GaS2. If the determination in step S306 is affirmative (Ga2>GaS2), the ECU 16 proceeds to step S307. On the other hand, if the determination in step S306 is negative (Ga2≦GaS2), the ECU 16 proceeds to step S309. The second reference air quantity GaS2 has been determined in advance as a value that is larger than the first reference air quantity GaS1 by the aforementioned predetermined amount.

In step S307, the ECU 16 makes a determination as to whether or not the timer counter t is smaller than a reference time t0. If the determination in step S307 is affirmative (t<t0), the ECU 16 proceeds to step S308 and obtains a differential pressure dP2 across the PM trapper 11 under high load from a measurement value of the differential pressure sensor 20.

On the other hand, if the determination in step S307 is negative (t≧t0), the ECU 16 once terminates the execution of this routine. The reference time t0 has been determined in advance based on the aforementioned predetermined time.

In step S309, the ECU 16 makes a determination as to whether or not the timer counter t is smaller than the reference time t0. If the determination in step S309 is affirmative (t<t0), the ECU 16 returns to step S305. On the other hand, if the determination in step S309 is negative, (t≧t0), the ECU 16 once terminates the execution of this routine.

In step S310, the ECU 16 calculates the differential pressure change ratio R. Here, the differential pressure change ratio R is defined as the ratio of the amount of change ΔdP in the differential pressure across the PM trapper 11 to the amount of change ΔGa in the intake air quantity and calculated, in the case of this routine, by R=ΔdP/ΔGa=(dP2−dP1)/(Ga2−Ga1).

Next in step S311, the ECU 16 makes a determination as to whether or not the differential pressure change ratio R calculated in step S310 is smaller than a reference differential pressure change ratio R0. Here, the reference differential pressure change ratio R0 is a differential pressure change ratio of a normal PM trapper 11 and determined in advance by, for example, experiments.

If the determination in step S311 is affirmative (R<R0), the ECU 16 makes a determination, in step S312, that the PM trapper 11 is faulty, and once terminates the execution of this routine. On the other hand, if the determination in step S311 is negative (R≧R0), the ECU 16 makes a determination, in step S313, that the PM trapper 11 is normal, and once terminates the execution of this routine.

Figure 4:
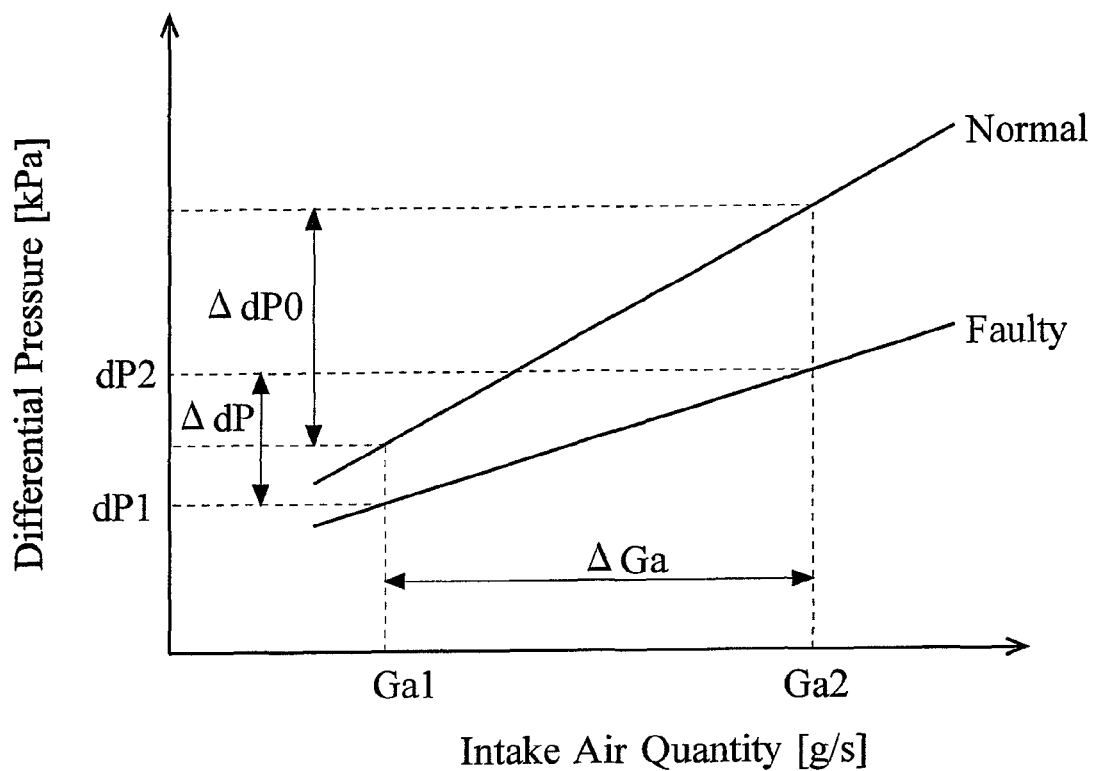
FIG. 4 is a graph showing correlations between the intake air quantity and the differential pressure across the PM trapper respectively in a case in which the PM trapper is normal and in a case in which the PM trapper is faulty in the embodiment of the present invention.

FIG. 4 is a graph showing correlations between the intake air quantity and the differential pressure respectively in a case in which the PM trapper 11 is normal and in a case in which the PM trapper 11 is faulty. The horizontal axis of FIG. 4 represents the intake air quantity and the vertical axis represents the differential pressure across the PM trapper 11. As shown in FIG. 4, in the case in which the PM trapper 11 is faulty, the differential pressure change ratio (i.e. the gradient of the straight line in FIG. 4) is smaller as compared to that in the case in which the PM trapper 11 is normal. In FIG. 4, $\Delta dP0$ represents the amount of change in the differential pressure across the normal PM trapper 11 associated with a change in the intake air quantity of $\Delta Ga$. Namely, equation $R0=\Delta dP0/\Delta Ga$ holds.

The embodiment described in the foregoing is an example presented for explanation of the present invention, and various modifications may be made to the above described embodiment without departing from the essence of the present invention. For example, although the above described routine of fault determination for the PM trapper 11 is a routine that determines a fault of the PM trapper 11 at a time when the intake air quantity is on the increase (e.g. during acceleration), a fault of the PM trapper 11 can be determined by a similar fault determination routine also at a time when the intake air quantity is on the decrease (e.g. during deceleration). In the latter case, an intake air quantity under high load that is larger than the second reference air quantity is first obtained, then an intake air quantity under low load that is smaller than the first reference air quantity is obtained within a predetermined time after that, and the differential pressure change ratio is obtained.

INDUSTRIAL APPLICABILITY

By the present invention, it is made possible to detect a fault of a PM trapper with improved accuracy.

The invention claimed is:

1. A fault detection system for a PM trapper comprising:
a PM trapper that traps particulate matter in exhaust gas of an internal combustion engine;
a differential pressure sensor that measures a differential pressure across said PM trapper; and
a fault detection unit configured to detect a fault of said PM trapper based on an amount of change in the differential pressure across said PM trapper associated with a change in an operation state of said internal combustion engine wherein an amount of change in ambient temperature around said differential pressure sensor is not larger than a predetermined amount.

2. A fault detection system for a PM trapper according to claim 1, wherein said fault detection unit is configured to detect a fault of said PM trapper based on a ratio of the amount of change in the differential pressure across said PM trapper and an amount of change in the intake air quantity associated with the change in the operation state of said internal combustion engine.

3. A fault detection system for a PM trapper, comprising:
a PM trapper that traps particulate matter in exhaust gas of an internal combustion engine;
a differential pressure sensor that measures a differential pressure across said PM trapper; and
a fault detection unit configured to calculate a ratio of an amount of change in the differential pressure across said PM trapper to an amount of change in the intake air quantity associated with a change in the operation state of said internal combustion engine, and to detect a fault of said PM trapper based on the calculated ratio of the amount of change in the differential pressure across said PM trapper and the amount of change in the intake air quantity.

* * * * *